(12) United States Patent
Nelogal et al.

(10) Patent No.: US 11,100,033 B1
(45) Date of Patent: Aug. 24, 2021

(54) SINGLE-ROOT INPUT/OUTPUT VIRTUALIZATION-BASED STORAGE SOLUTION FOR SOFTWARE DEFINED STORAGE

(71) Applicant: Dell Products L.P., Round Rock, TX (US)

(72) Inventors: Chandrashekar Nelogal, Round Rock, TX (US); Syama S. Poluri, Round Rock, TX (US); Vijay B. Nijhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/862,986

(22) Filed: Apr. 30, 2020

(51) Int. Cl.
| | |
|---|---|
| G06F 13/40 | (2006.01) |
| G06F 9/455 | (2018.01) |
| G06F 9/4401 | (2018.01) |
| G06F 13/42 | (2006.01) |
| G06F 3/06 | (2006.01) |

(52) U.S. Cl.
CPC ........ G06F 13/4068 (2013.01); G06F 3/0604 (2013.01); G06F 3/0631 (2013.01); G06F 3/0664 (2013.01); G06F 3/0673 (2013.01); G06F 9/4406 (2013.01); G06F 9/45558 (2013.01); G06F 13/4221 (2013.01); G06F 2009/45579 (2013.01); G06F 2009/45583 (2013.01); G06F 2213/0024 (2013.01)

(58) Field of Classification Search
None
See application file for complete search history.

(56) References Cited

U.S. PATENT DOCUMENTS

2019/0384923 A1* 12/2019 Leitao ................... G06F 21/606
2020/0050385 A1* 2/2020 Furey .................... G06F 3/0614

* cited by examiner

*Primary Examiner* — Scott C Sun
(74) *Attorney, Agent, or Firm* — Jackson Walker L.L.P.

(57) ABSTRACT

A system for processing data may include a plurality of storage resources coupled to a backplane, a storage controller coupled to the backplane and configured to couple to an information handling system. The storage controller may configured to implement, using single-root input/output virtualization a first virtual function allocated to a first set of one or more of the plurality of storage resources and allocated to a software-defined storage virtual machine executing on a hypervisor of the information handling system and one of a physical function and a second virtual function allocated to a second set of one or more of the plurality of storage resources and allocated to the hypervisor.

21 Claims, 4 Drawing Sheets

SINGLE-ROOT INPUT/OUTPUT VIRTUALIZATION-BASED STORAGE SOLUTION FOR SOFTWARE DEFINED STORAGE

TECHNICAL FIELD

The present disclosure relates generally to an information handling system that utilizes software-defined storage (SDS), and more specifically to an information handling system that uses a single-root input/output virtualization (SR-IOV)-based storage solution for SDS.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Software-defined storage (SDS) architectures are often used for storing data. Many SDS architectures are implemented as virtual machines wherein storage redundancy, availability, and serviceability features are implemented in a storage-aware virtual machine. In such implementations, the main storage controller and the associated drives are mapped to a guest operating system (e.g., virtual machine) and a hypervisor upon which the guest operating system runs may boot from a different computer-readable media other than the drives mapped to the guest operating system.

In many storage device platforms, a hypervisor may be installed on a Boot Optimized Storage Solution (BOSS) which implements Redundant Array of Inexpensive Disks (RAID) Level (RAID-1) logic for redundancy. In such a solution, the hypervisor may typically be installed on a boot device that is separate from the storage controller. Because the storage controller is passed on to the virtual machine, the hypervisor cannot be installed onto the storage controller and may require separate boot hardware. In a platform where peripheral slots are at a premium, and the total cost of a solution is of concern, it may be desirable to eliminate a need for such additional hardware.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with implementing software-defined storage may be reduced or eliminated.

In accordance with embodiments of the present disclosure, a system for processing data may include a plurality of storage resources coupled to a backplane, a storage controller coupled to the backplane and configured to couple to an information handling system. The storage controller may configured to implement, using single-root input/output virtualization a first virtual function allocated to a first set of one or more of the plurality of storage resources and allocated to a software-defined storage virtual machine executing on a hypervisor of the information handling system and one of a physical function and a second virtual function allocated to a second set of one or more of the plurality of storage resources and allocated to the hypervisor.

In accordance with these and other embodiments of the present disclosure, a method for processing data in a system comprising a plurality of storage resources coupled to a storage controller may include implementing with the storage controller, using single-root input/output virtualization, a first virtual function allocated to a first set of one or more of the plurality of storage resources and allocated to a software-defined storage virtual machine executing on a hypervisor of an information handling system to which the storage controller is communicatively coupled and one of a physical function and a second virtual function allocated to a second set of one or more of the plurality of storage resources and allocated to the hypervisor.

In accordance with these and other embodiments of the present disclosure, a storage controller may be configured to communicatively couple to an information handling system, communicatively couple to a plurality of storage resources, and implement, using single-root input/output virtualization a first virtual function allocated to a first set of one or more of the plurality of storage resources and allocated to a software-defined storage virtual machine executing on a hypervisor of the information handling system and one of a physical function and a second virtual function allocated to a second set of one or more of the plurality of storage resources and allocated to the hypervisor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
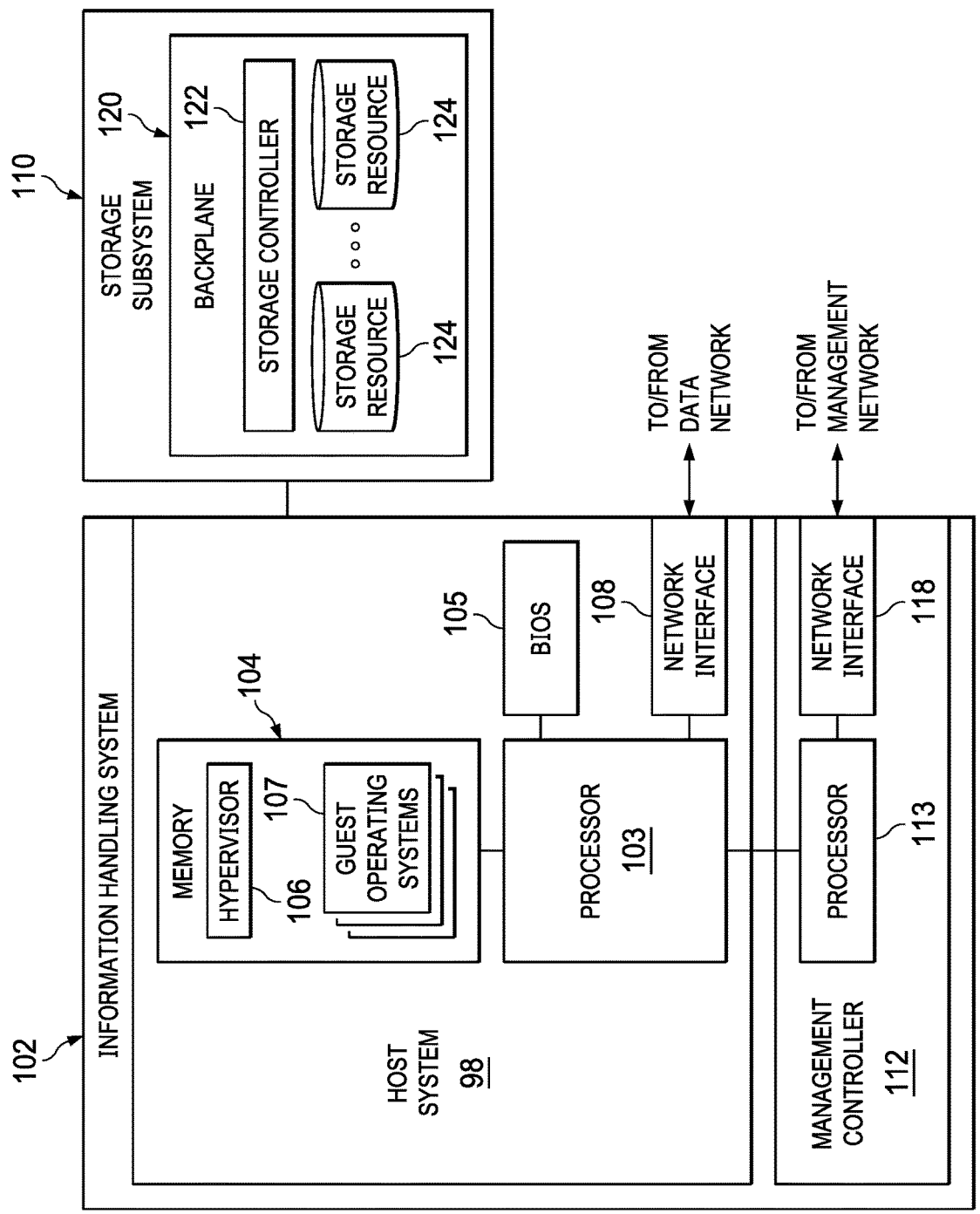
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources" or simply "storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, a memory 104 may have stored thereon a hypervisor 106 and one or more guest operating systems (OS) 107. In some embodiments, hypervisor 106 and one or more of guest OSes 107 may be stored in a computer-readable medium (e.g., a local or remote hard disk drive) other than a memory 104 which is accessible to processor 102.

A hypervisor 106 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. A hypervisor 106 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, AWS Nitro, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In some embodiments, a hypervisor 106 may comprise a specially-designed OS with native virtualization capabilities. In another embodiment, a hypervisor 106 may comprise a standard OS with an incorporated virtualization component for performing virtualization.

In other embodiments, a hypervisor 106 may comprise a standard OS running alongside a separate virtualization application. In such embodiments, the virtualization application of the hypervisor 106 may be an application running above the OS and interacting with computing system resources only through the OS. Alternatively, the virtualization application of a hypervisor 106 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 106 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 106 may instantiate one or more virtual machines. A virtual machine may comprise any program of executable instructions, or aggregation of programs of executable instructions, configured to execute a guest OS 107 in order to act through or in connection with a hypervisor 106 to manage and/or control the allocation and usage of hardware resources such as memory, CPU time, disk space, and input and output devices, and provide an interface between such hardware resources and application programs hosted by the guest OS 107. In some embodiments, a guest OS 107 may be a general-purpose OS such as WINDOWS or LINUX, for example. In other embodiments, a guest OS 107 may comprise a specific- and/or limited-purpose OS, configured so as to perform application-specific functionality (e.g., manage persistent storage).

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), Inter-Integrated Circuit (I2C), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Additionally, information handling system 102 may be coupled to storage subsystem 110. In some embodiments, storage subsystem 110 may be an external drive enclosure including one or more storage resources 124 therein. In other embodiments, storage subsystem 110 may be an integral part of information handling system 102. For example, in some embodiments, information handling system 102 may itself be a drive enclosure. As shown in FIG. 1, storage subsystem 110 may include a backplane 120 having a storage controller 110 and a plurality of storage resources 124.

Backplane 120 may comprise any system, device, or apparatus configured to provide electrical connectivity between host system 98 (e.g., processor 103) and components disposed on backplane 120 (e.g., storage controller 122 and storage resources 124).

Storage controller 122 may include any system, apparatus, or device operable to manage the communication of data between processor 103 and storage resources 124. In certain embodiments, storage controller 122 may provide functionality including, without limitation, disk aggregation and redundancy (e.g., RAID), I/O routing, and error detection and recovery. Storage controller 122 may also have features supporting shared storage and high availability. In some embodiments, storage controller 122 may comprise a PowerEdge RAID Controller (PERC) manufactured by Dell Inc. In these and other embodiments, storage controller 122 may include a storage enclosure processor (SEP) as a component thereof. In some embodiments, storage controller 122 may be configured to execute single-root input/output virtualization (SR-IOV) functionality.

A storage resource 124 may include one or more solid state drives, hard disk drives, magnetic tape libraries, optical disk drives, magneto-optical disk drives, compact disk drives, compact disk arrays, disk array controllers, and/or any other system, apparatus or device operable to store media. In some embodiments, a storage resource 124 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard.

In addition to processor 103, memory 104, BIOS 105, a storage controller 106, network interface 108, storage subsystem 110, and management controller 112, information handling system 102 may include one or more other information handling resources.

Figure 2:
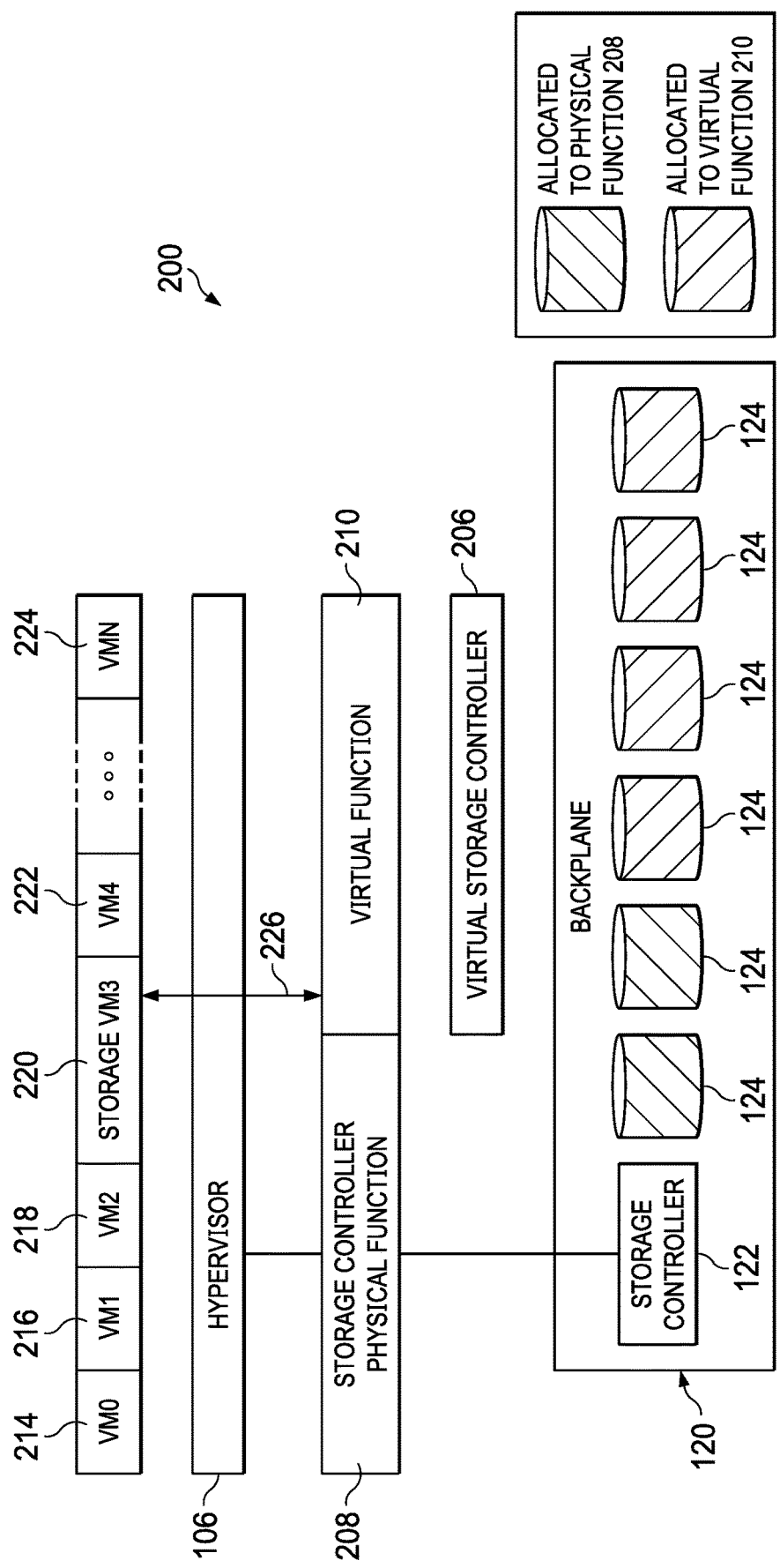
FIG. 2 illustrates a functional block diagram of an example system for allocating a physical function to a hypervisor, in accordance with embodiments of the present disclosure.

FIG. 2 illustrates a functional block diagram of an example system for allocating a physical function 208 to hypervisor 106, in accordance with embodiments of the present disclosure. In some embodiments, system 200 may be implemented by selected components of information handling system 102 and storage subsystem 110.

As shown in FIG. 2, a plurality of VMs (e.g., VMs 214, 216, 218, 220, 222, 224) including a storage VM 220 may run on hypervisor 106. Each VM may execute as a guest operating system 107 on hypervisor 106.

In system 200, storage controller 122 may allocate a storage controller physical function 208 to hypervisor 106, and allocate selected storage resources 124 to storage controller physical function 208, in accordance with SR-IOV, as shown in FIG. 2. Storage resources 124 allocated to storage controller physical function 208 may thus be used by hypervisor 106.

In addition, storage controller 122 may instantiate a virtual function 210 in accordance with SR-IOV, including the mapping of a virtual storage controller 206 to virtual function 210. In some embodiments, virtual storage controller 206 may be a software instantiation of storage controller 122, in order to virtualize the management of one or more storage devices 124 of backplane 120. In some embodiments, virtual storage controller 206 may implement/emulate functionality of a storage enclosure processor, including functionality such as blinking LEDs and other functionality specific to storage enclosures. In addition, storage controller 122 may allocate virtual function 210 to storage VM 220, and allocate (e.g., via a Peripheral Component Interconnect Enhanced (PCIe) pass-through mechanism 226) selected storage resources 124 to virtual function 210, in accordance with SR-IOV, as shown in FIG. 2. Storage resources 124 allocated to virtual function 210 may thus be used by storage VM 220.

In accordance with system 200 depicted in FIG. 2, hypervisor 106 may boot normally using physical function 208 and storage VM 220 may implement SDS via virtual function 210.

Figure 3:
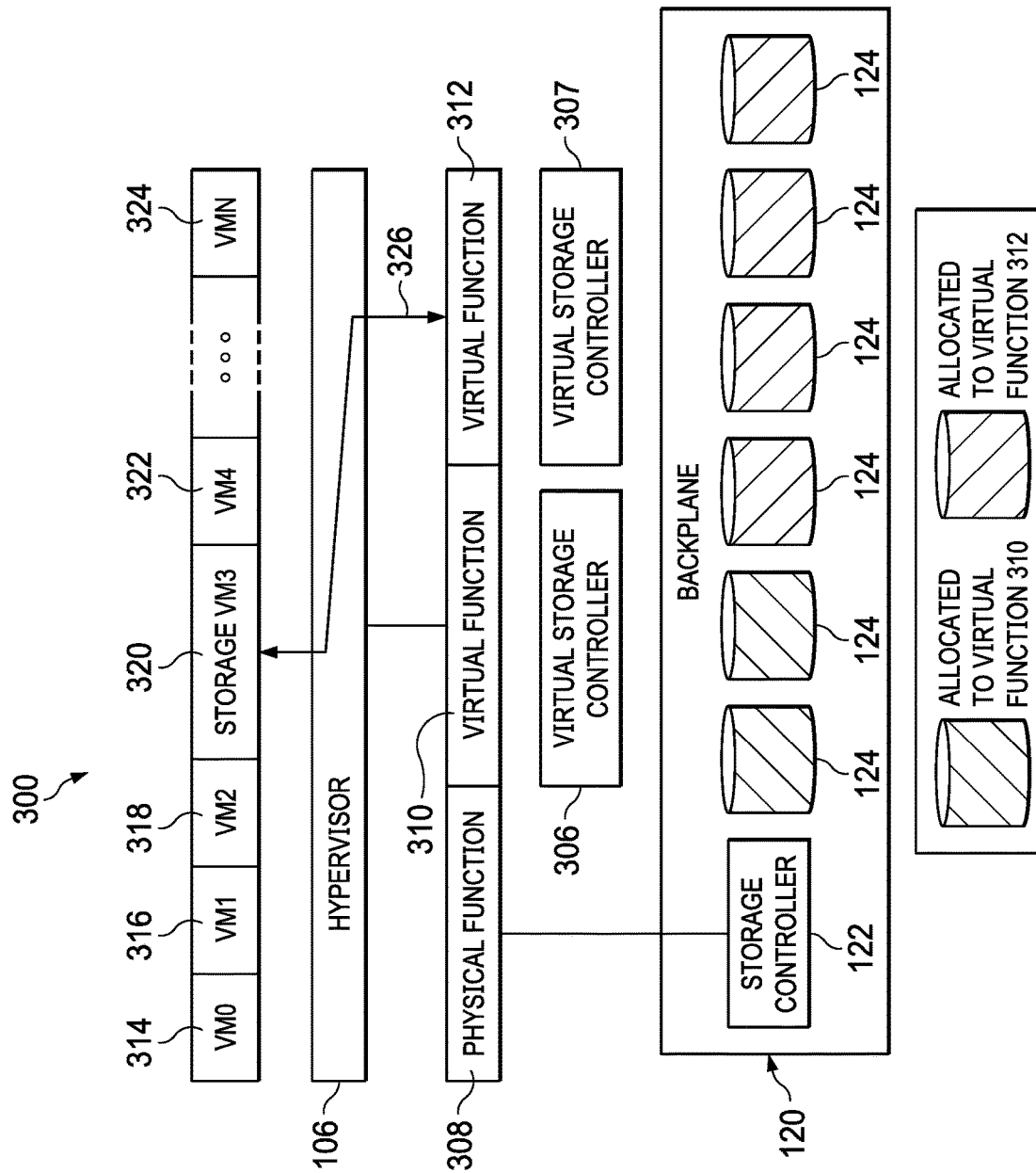
FIG. 3 illustrates a functional block diagram of an example system for allocating a virtual function to a hypervisor, in accordance with embodiments of the present disclosure.

FIG. 3 illustrates a functional block diagram of an example system 300 for allocating a virtual function 310 to hypervisor 106, in accordance with embodiments of the present disclosure. In some embodiments, system 300 may be implemented by selected components of information handling system 102 and storage subsystem 110.

As shown in FIG. 3, a plurality of VMs (e.g., VMs 314, 316, 318, 320, 322, 324) including a storage VM 320 may run on hypervisor 106. Each VM may execute as a guest operating system 107 on hypervisor 106.

In system 300, storage controller 122 may instantiate a virtual function 310 in accordance with SR-IOV, including the mapping of a virtual storage controller 306 to virtual function 310. In some embodiments, virtual storage controller 306 may be a software instantiation of storage controller 122, in order to virtualize the management of one or more storage devices 124 of backplane 120. In some embodiments, the functionality of virtual storage controller 306 may be implemented by virtual function 310. In addition, storage controller 122 may allocate virtual function 310 to hypervisor 106 and allocate selected storage resources 124 to virtual function 310, in accordance with SR-IOV, as shown in FIG. 3. Storage resources 124 allocated to virtual function 310 may thus be used by hypervisor 106. For example, some server platforms support physical storage resources in the rear thereof for booting purposes, and such storage resources may be allocated to virtual function 310.

In addition, storage controller 122 may instantiate a virtual function 312 in accordance with SR-IOV, including the mapping of a virtual storage controller 307 to virtual function 312. In some embodiments, virtual storage controller 307 may be a software instantiation of storage controller 122, in order to virtualize the management of one or more storage devices 124 of backplane 120. In some embodiments, the functionality of virtual storage controller 307 may be implemented by virtual function 312. In addition, storage controller 122 may allocate virtual function 312 to storage VM 320, and allocate (e.g., via a Peripheral Component Interconnect Enhanced (PCIe) pass-through mechanism 326) selected storage resources 124 to virtual function 312, in accordance with SR-IOV, as shown in FIG. 3. Storage resources 124 allocated to virtual function 310 may thus be used by storage VM 320.

In accordance with system 300 depicted in FIG. 3, hypervisor 106 may boot normally using virtual function 308 and storage VM 320 may implement SDS via virtual function 312.

In system 300, physical function 308 may be used for monitoring purposes and/or to communicate with management controller 112 (e.g., via a sideband interface). Indeed, one advantage of system 300 over system 200 is that the physical infrastructure management can be centered around physical function 308 and the hypervisor boot-specific and storage-specific virtual functions may have specific functionalities associated with them.

Figure 4:
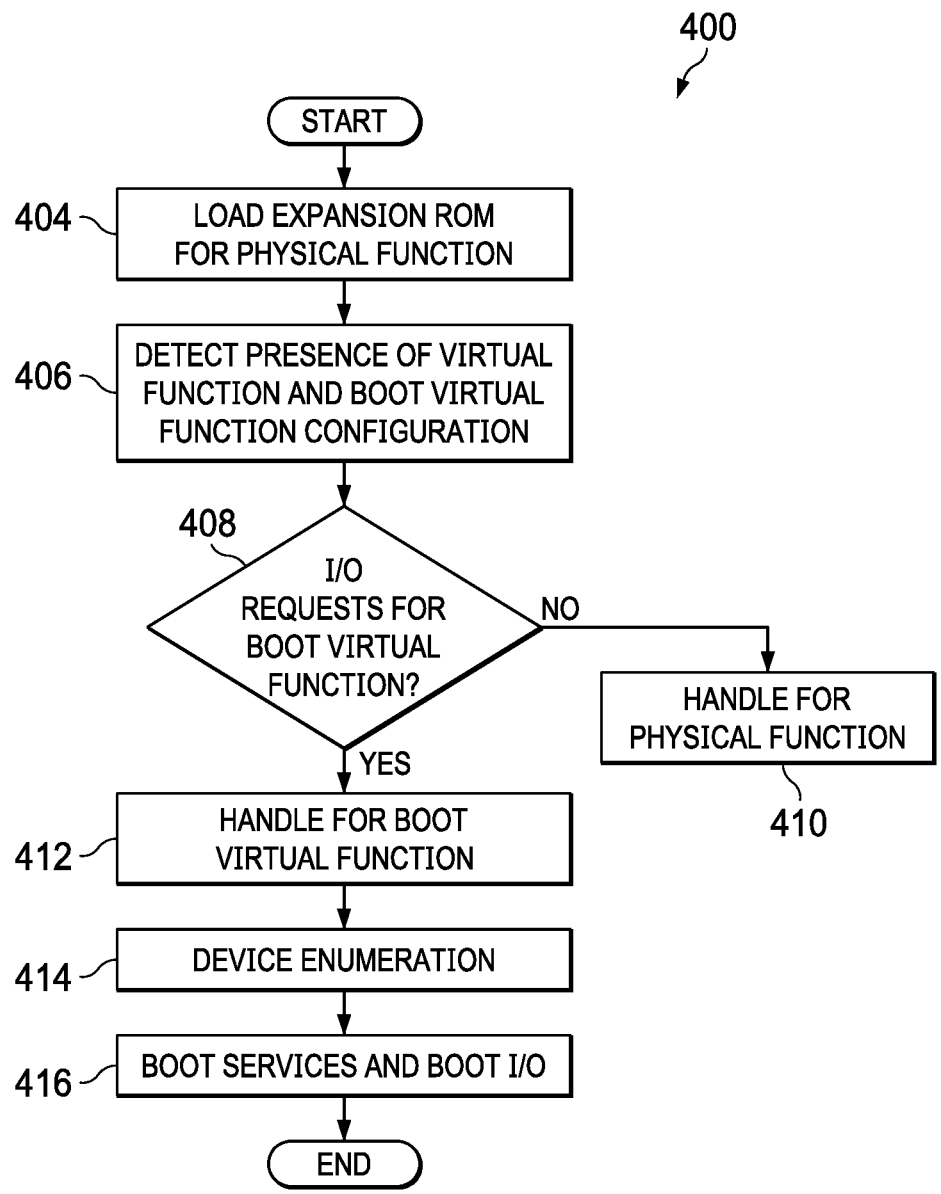
FIG. 4 illustrates a flow chart of an example method for allocating a physical function or a virtual function to a hypervisor, in accordance with embodiments of the present disclosure.

FIG. 4 illustrates a flow chart of an example method 400 for allocating a physical function or a virtual function to a hypervisor, in accordance with embodiments of the present disclosure. According to some embodiments, method 400 may begin at step 404. As noted above, teachings of the present disclosure may be implemented in a variety of configurations of information handling system 102. As such, the preferred initialization point for method 400 and the order of the steps comprising method 400 may depend on the implementation chosen.

At step 404, method 400 may begin, such as during a system initiation operation for an SR-IOV-capable system or in other suitable embodiments. At step 404, a common option read-only memory (ROM), such as an expansion ROM for a physical function is loaded, which can be loaded onto a processor and used to find the drives behind each virtual function that is present on the controller.

At step 406, a presence of a virtual function and a boot virtual function configuration is detected. In some embodiments, when firmware for a UEFI system loads and executes the expansion ROM of a storage controller on the processor of the controller, the expansion ROM code operating on the controller processor may detect the virtual function configuration of the controller, and the processor may handle storage-specific requests from the UEFI, or from a legacy system basic input/output operating system (BIOS).

At 408, firmware for the UEFI may determine whether I/O requests for the boot virtual function have been received. If it is determined that I/O requests for the boot virtual function have not been received, method 400 may proceed to 410, where the firmware implements handling for configuring the physical function of the controller. In one example embodiment, the hypervisor can be handled by the physical function and a virtual function can be used for a storage virtual machine, or other suitable configurations can be implemented. Otherwise, method 400 may proceed to 412.

At 412, the firmware operating on the processor handles booting from a virtual function. In one example embodiment, the boot from the virtual function can be run in an emulation mode, where the option ROM code services BIOS requests for the Int 19h and Int 13h services in legacy boot mode and services EFI_BOOT_SEVICES in UEFI boot mode, or other suitable functions can be performed. The algorithm then proceeds to 414.

At 414, device enumeration continues with the boot services provided by the physical function including services for the virtual functions. In one example embodiment, one or more input/output requests required for booting purposes can be serviced by a virtual function, and the option ROM code operating on the processor can route the requests the boot virtual function. The UEFI driver can emulate by enumerating the devices that are associated with the boot virtual function. The algorithm then proceeds to 416.

At 416, the UEFI driver can handle the boot services and the input/output functions that are sent, and other suitable functions. After step 416, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 100 may be completed in any suitable order.

Method 400 may be implemented using one or more information handling systems 102, components thereof, and/or any other system operable to implement method 400. In certain embodiments, method 400 may be implemented partially or fully in software and/or firmware embodied in computer-readable media.

Accordingly, in accordance with the systems and methods disclosed above, a storage controller may leverage SR-IOV capabilities to map the storage devices in a manner where the storage devices required for the hypervisor functionality and the storage devices used for data storage are mapped to separate PCIe functions but still achieve SDS requirements.

In an SR-IOV capable controller, each PCIe virtual function may have its own PCI configuration space. A physical function may implement firmware from a common option ROM, such as an expansion ROM, that can find storage resources behind each virtual function present on the controller. Based on how the drives are configured, the option ROM may show different boot storage resources to a boot manager. A system may be configured to keep an operating system image on one of the boot devices associated with the boot virtual function, and other data on the other drives that are separate from the operating system image drive.

When firmware loads for a UEFI system and executes on the expansion ROM of the controller, the expansion ROM may detect the virtual function configuration of the controller and appropriately handle the storage specific requests from the UEFI or legacy system BIOS. When the expansion ROM runs it can (a) detect the virtual capability of the storage controller, as well as (b) that the boot virtual is enabled, after which it may enter an emulation mode. As part of the emulation, the option ROM can service any BIOS interrupt requests, such as Int 13h and Int 19h.

By emulating BIOS interrupt requests, the boot services provided by the physical function may be used to provide service for the virtual functions. All subsequent I/O required for booting purposes may be serviced by the virtual function and the option ROM can route the requests to the boot virtual function. The UEFI driver can emulate by (a) enumerating the devices that are associated with the boot virtual function, and (b) handling the boot services and I/O requests. Once the storage controller boots into an operating system, all subsequent PCIe configuration and storage I/O requests may be serviced from the virtual function. For the purposes of the hypervisor, the virtual function may be the boot device. The physical function may be used for pre-OS boot services as the PCIe SR-IOV specification may not provide for an expansion ROM address to a virtual function.

In the SCSI enclosure service (SES) domain, the hypervisor and the virtual functions may each manage and control storage resource LEDs in a manner that is specific for each entity. For the SES domain, separate SEP devices (virtual) may be instantiated that correspond to the physical function and virtual functions. In each of the virtual SEP devices, a suitable source, such as SES page 01h, can indicate a total number of elements (such as a number of possible elements in a type descriptor header) that correspond to a number of drives mapped to each virtual function or physical function.

In this example embodiment, a first instance of the virtual SEP device (e.g. that is instantiated on a virtual function) may be used to indicate that the number of possible elements in an SES page 1 (e.g., a type descriptor header for element type array device element) would be 2. The same value from a second instance of the virtual SEP may indicate a number of possible elements as the remaining drives eligible for main storage, or other suitable information.

The present disclosure also allows an element called "slot offset" to be stored in a suitable location, such as in the SES page 01h. The slot offset may be used to depict a non-zero starting slot offset for a given SES domain or other suitable data. The "device slot number" field may be stored for a drive in a predetermined location, such as SES page 0Ah, it can also be beneficial to have a slot offset stored in a location, such as page 02h, so that the array device slot elements can be interpreted in order and their respective slots can be derived, as well as for other suitable purposes.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for processing data, comprising:
   a plurality of storage resources coupled to a backplane;
   a storage controller, coupled to the backplane, to manage communication of data between a processor of an information handling system and the plurality of storage drives, wherein the storage controller is configured to couple to an information handling system, the storage controller configured to implement, using single-root input/output virtualization:
   a first virtual function allocated to a first set of one or more of the plurality of storage drives and allocated to a software-defined storage virtual machine executing on a hypervisor of the information handling system; and
   one of a physical function and a second virtual function allocated to a second set of one or more of the plurality of storage drives and allocated to the hypervisor.

2. The system of claim 1, wherein the second set of one or more of the plurality of storage drives comprises computer-readable code for booting the hypervisor.

3. The system of claim 1, the storage controller further configured to instantiate a virtual storage controller allocated to the first virtual function and emulating the storage controller.

4. The system of claim 1, wherein the second virtual function is allocated to the second set of one or more of the plurality of storage drives, and the storage controller further is configured to instantiate a virtual storage controller allocated to the first virtual function and emulating the storage controller.

5. The system of claim 1, wherein the second virtual function is allocated to the second set of one or more of the plurality of storage drives, and the physical function is allocated to monitoring the storage controller and the plurality of storage drives.

6. The system of claim 1, wherein the physical function is further allocated to communication with a management controller of the information handling system.

7. The system of claim 1, wherein the first virtual function is implemented in accordance with Peripheral Component Interconnect.

8. A method for processing data in a system comprising a plurality of storage drives coupled to a storage controller, the method comprising:
   implementing with the storage controller, using single-root input/output virtualization:
   a first virtual function allocated to a first set of one or more of the plurality of storage drives and allocated to a software-defined storage virtual machine executing on a hypervisor of an information handling system to which the storage controller is communicatively coupled; and
   one of a physical function and a second virtual function allocated to a second set of one or more of the plurality of storage drives and allocated to the hypervisor.

9. The method of claim 8, wherein the second set of one or more of the plurality of storage drives comprises computer-readable code for booting the hypervisor.

10. The method of claim 8, further comprising instantiating on the storage controller a virtual storage controller allocated to the first virtual function and emulating the storage controller.

11. The method of claim 8, further comprising:
allocating, with the storage controller, the second virtual function to the second set of one or more of the plurality of storage drives; and
instantiating on the storage controller a virtual storage controller allocated to the first virtual function and emulating the storage controller.

12. The method of claim 8, further comprising:
allocating, with the storage controller, the second virtual function to the second set of one or more of the plurality of storage drives;
allocating, with the storage controller, the physical function to monitoring the storage controller and the plurality of storage drives.

13. The method of claim 8, further comprising allocating, with the storage controller, the physical function to communication with a management controller of the information handling system.

14. The method of claim 8, further comprising implementing, with the storage controller, the first virtual function in accordance with Peripheral Component Interconnect.

15. A storage controller configured to:
communicatively couple to an information handling system;
communicatively couple to a plurality of storage drives; and
implement, using single-root input/output virtualization:
a first virtual function allocated to a first set of one or more of the plurality of storage drives and allocated to a software-defined storage virtual machine executing on a hypervisor of the information handling system; and
one of a physical function and a second virtual function allocated to a second set of one or more of the plurality of storage drives and allocated to the hypervisor.

16. The storage controller of claim 15, wherein the second set of one or more of the plurality of storage drives comprises computer-readable code for booting the hypervisor.

17. The storage controller of claim 15, further configured to instantiate a virtual storage controller allocated to the first virtual function and emulating the storage controller.

18. The storage controller of claim 15, wherein the second virtual function is allocated to the second set of one or more of the plurality of storage drives, and the storage controller further is configured to instantiate a virtual storage controller allocated to the first virtual function and emulating the storage controller.

19. The storage controller of claim 15, wherein the second virtual function is allocated to the second set of one or more of the plurality of storage drives, and the physical function is allocated to monitoring the storage controller and the plurality of storage drives.

20. The storage controller of claim 15, wherein the physical function is further allocated to communication with a management controller of the information handling system.

21. The storage controller of claim 15, wherein the first virtual function is implemented in accordance with Peripheral Component Interconnect.

* * * * *